C. E. MORGAN.
MOTOR CYCLE SUPPORT.
APPLICATION FILED OCT. 16, 1917.
1,280,069.
Patented Sept. 24, 1918.
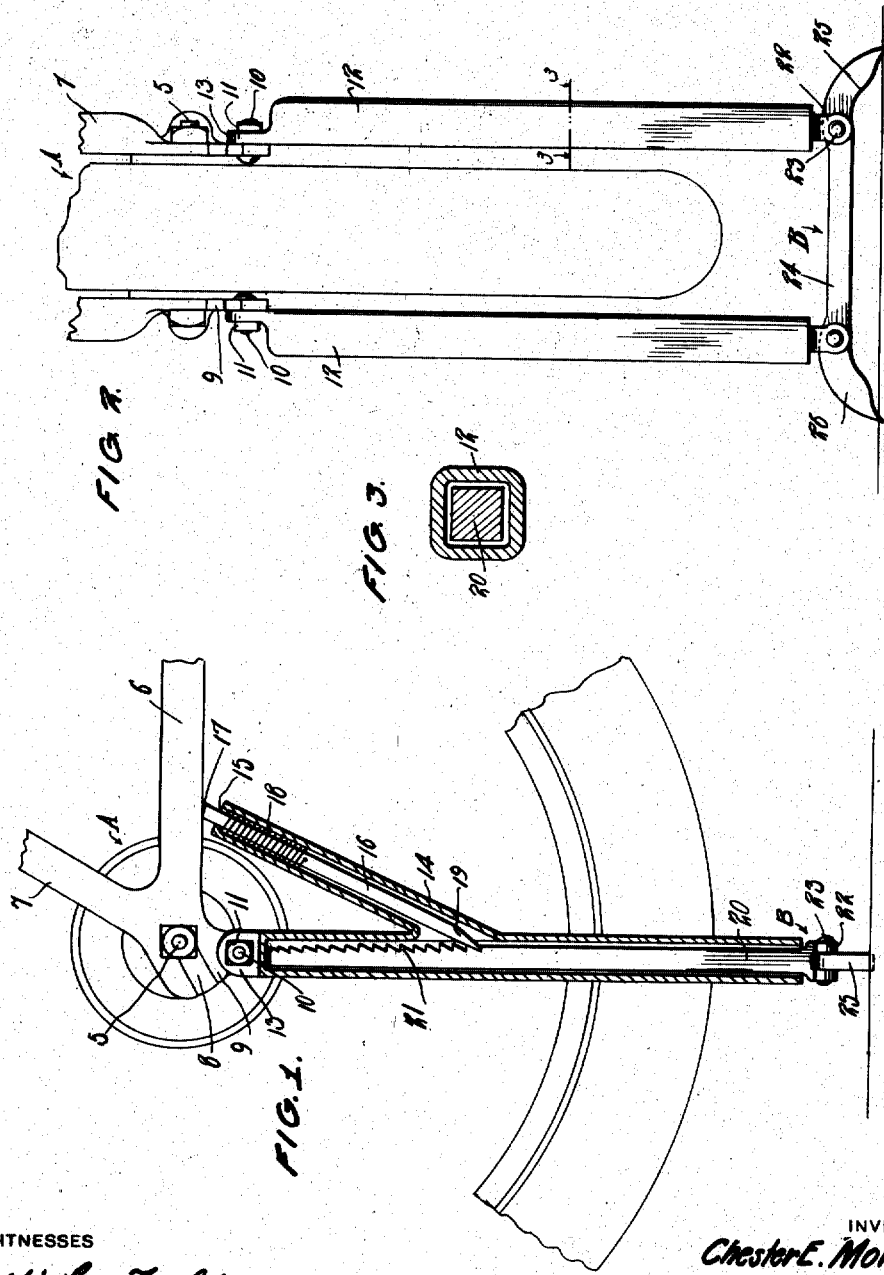
WITNESSES
W. C. Fielding
H. G. Pierson
INVENTOR
Chester E. Morgan
BY Richard Owen
ATTORNEY

UNITED STATES PATENT OFFICE.

CHESTER E. MORGAN, OF SNYDER, OKLAHOMA.

MOTOR-CYCLE SUPPORT.

1,280,069.  Specification of Letters Patent.  Patented Sept. 24, 1918.

Application filed October 16, 1917.  Serial No. 196,904.

*To all whom it may concern:*

Be it known that I, CHESTER E. MORGAN, a citizen of the United States, residing at Snyder, in the county of Kiowa and State of Oklahoma, have invented certain new and useful Improvements in Motor-Cycle Supports, of which the following is a specification.

This invention is a foldable stand or support for wheel vehicles of the general type known as motorcycles or bicycles.

The principal object of the invention is to provide a stand or support for motorcycles wherein the rear wheel is supported clear and free from ground contact.

Another object is to provide a stand that will automatically adjust itself to the unevenness of the ground or road, in a firm and substantial manner, so that the motorcycle will be maintained in an upright position during such supporting period.

A still further object is to provide a stand that consists of few parts lessening the liability of disarrangement and breakage, one that may be readily applied and used with a minimum of effort, one that is effectual to accomplish the function desired of it, and one that is relatively cheap to manufacture.

The invention broadly stated comprises a pair of sleeves pivotally connected to the rear fork of a motorcycle and upon each side of the wheel thereof, said sleeve being provided with a tubular member connected to and branching therefrom, a perforated cap for each of the tubular members, a spring operated latch bar disposed in each of the tubular members, one end of said bar projecting through the cap and engaging with the rear fork while the opposite end is adapted to engage with notches formed in and near one end of rods disposed within said sleeves, said rods being pivotally connected at their other end with a ground engaging element which is provided with curved and pointed ends, said rods being telescopically receivable in said sleeves and said latch bar serving to maintain the rods in different positions relative to the unevenness of the ground contact.

One practical form of construction and assembly will be described and illustrated in the accompanying drawings in which, Figure 1 is a vertical sectional view through one of the sleeves and its tubular member, said sleeve being attached to the rear fork and in an operative position, Fig. 2, is a rear elevation of the stand or support in its operative position, and Fig. 3 is a sectional view on the line 3—3 of Fig. 2.

In the preferred embodiment about to be described, the support or stand is preferably attached to the rear fork A adjacent the connection for the rear wheel, the axle thereof being indicated at 5. The fork A as shown is of the usual construction and is composed of the horizontal member 6 connected to the seat support or bracing member 7.

The juncture of the two members 6 and 7 provides a projecting ear in which is formed a slot 8. The lower ear indicated at 9 is provided with an extension having a hole therethrough. To coöperate with this hole there is a bolt 10 that is provided with the nut 11. This bolt 10 and its nut 11 provide a pivotal connection for the sleeve 12.

The sleeve 12 is preferably formed of squared tubing having one of its ends open while the other is compressed to such a degree that it forms the lug 13. This lug is provided with a hole to coöperate with the bolt 10. As shown the bolt 10 passes through the ear 9 through the lug 13 and then has placed thereon the nut 11. Thus a pivotal connection is provided. As will be seen the description of one side of the stand will apply to the opposite side as both sides are similarly formed and constructed.

The sleeve 12 has connected thereto a tubular member 14 which branches from the sleeve 12 in an angular direction thereto. The tubular member 14 is provided with a cap or other closure 15. This cap or closure 15 is provided centrally with a hole.

Disposed within the tubular member is a latch bar 16, one end of which, indicated at 17, projects through the hole in the cap 15. Surrounding a portion of the bar 16 is a spring 18 which is so connected that the spring operates to draw the end 19 within the tubular member 14. This end 19 of the latch bar is preferably angularly cut for reasons that will shortly be described.

A rod 20 is disposed to telescope within the sleeve 12. The upper end or portion of this rod may be provided with the notches or teeth 21 as shown. These notches are cut in such a manner that they will engage with the end 19 of the latch bar 16. They serve to prevent the rod from being returned within the sleeve when said rod has been adjusted. The lower end of the rod 20 may be forked as shown at 22 and through the sides of the fork there may pass the pin 23. This pin may be formed as a rivet if so desired and serves to provide a pivotal connection with the ground engaging element B.

The ground engaging element B consists of a transverse or horizontal portion 24 and connected thereto and continuous therewith are the curved and pointed ends 25 and 26. These ends are so shaped that they will bite into the road surface to firmly hold the motorcycle without side slipping when the support has been placed in an operative position. When the support is placed in the operative position as shown in Figs. 1 and 2 the free end 17 of the latch bar is adapted to contact with the under surface of the member 6 of the rear fork. This forces the latch bar downward into the tubular member 14. The latch bar 16 then has its end 19 projecting slightly into the sleeve 12. The distance that the point 19 projects depends upon the position of the rod 20, and its teeth 21.

The support may be attached to existing models of motorcycles with practically no change whatever in the rear fork. This type of support or stand provides for supporting the rear wheel of the motorcycle clear and free from contact with the ground. It also automatically takes care of the unevenness of the ground conditions.

When the support is released and is swung downward to its operative position the points 25 and 26 of the ground engaging element B contact with the ground. If the ground be uneven one of the rods 20 will project from this sleeve more than the other rod. As the motorcycle is moved backward the ends 17 of the latch bar 16 will engage with the horizontal member 6. The latch bar will thus automatically engage with the notches or teeth 21. The pivotal connection afforded by the pins 23 will permit of one of the points 25 or 26 to project and thereby pull the rod 20 farther from the sleeve 12. As the machine comes to rest upon the ends 17 of the latch bar the same is forced into engagement with the notches 21. The rods 20 will be held in their adjusted position through the locking action of the end 19 and the notches 21.

When it is desired to change the support from the operative to the inoperative position the motorcycle is moved forward and the support is lifted, the rods 20 will be free to move within their respective sleeves 12. The spring 18 will draw the latch bar 16 within the tubular member 14 thus withdrawing the point 19 from engagement with the notches 21.

Minor changes in form, proportion and details of construction may be resorted to without departing from the spirit of the invention or the scope of the appended claims.

I claim:

1. A motorcycle support comprising a ground engaging element composed of a U-shaped piece of material, a plurality of spaced rods pivotally connected to said element, a plurality of sleeves to coöperate with the rods in a telescopic manner, said sleeves being provided with a tubular member extending angularly therefrom and forming the housing for a latching device, and means for pivotally connecting the sleeves to the rear fork of a motorcycle.

2. A motorcycle support comprising a ground engaging element having curved and pointed ends, a plurality of rods pivotally connected to the element in a spaced relation, a plurality of sleeves formed to receive the rods, a tubular member connected to each of said sleeves intermediate their ends and branching angularly therefrom, a latch bar, a spring to press said bar outward from the rod for disengagement therewith, and means to connect one end of each of said sleeves to the rear fork of a motorcycle.

3. A motor cycle stand, comprising a ground engaging element, spaced rods pivotally connected thereto, sleeves for telescopically receiving the rods, said rods being provided with notches near their free ends, a tubular member connected to and branching from each of said sleeves, a perforated cap for each of said members, a spring operated latch bar, in each of said members, one end of which bar projects through the cap while the other is formed to engage with the notches of a rod, said latch bars serving to automatically hold the rods in their operative position when the ground element engages the ground, and means for providing a pivotal connection for one end of each of the sleeves to the rear fork of a motorcycle.

In testimony whereof I affix my signature in presence of two witnesses.

CHESTER E. MORGAN.

Witnesses:
WILL J. DICKSON,
J. D. THOMPSON.